(12) United States Patent
Siedle et al.

(10) Patent No.: US 9,790,105 B2
(45) Date of Patent: Oct. 17, 2017

(54) FILTRATION MEDIUM COMPRISING A CARBON OXYCHALCOGENIDE

(71) Applicant: 3M INNOVATIVE PROPERTIES COMPANY, St. Paul, MN (US)

(72) Inventors: Allen R. Siedle, Bloomington, IN (US); Mark R. Stouffer, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/193,156

(22) Filed: Jun. 27, 2016

(65) Prior Publication Data

US 2016/0304360 A1      Oct. 20, 2016

Related U.S. Application Data

(63) Continuation of application No. 14/342,784, filed as application No. PCT/US2012/052502 on Aug. 27, 2012, now Pat. No. 9,403,695.

(Continued)

(51) Int. Cl.
*C02F 1/28*      (2006.01)
*B01J 20/20*     (2006.01)
(Continued)

(52) U.S. Cl.
CPC .............. *C02F 1/283* (2013.01); *B01J 20/20* (2013.01); *B01J 20/261* (2013.01); *B01J 20/2803* (2013.01); *B01J 20/28016* (2013.01); *B01J 20/3085* (2013.01); *B01J 20/3204* (2013.01); *B01J 20/3236* (2013.01); *C01B 21/091* (2013.01); *C02F 1/288* (2013.01); *C02F 2101/12* (2013.01); *C02F 2101/36* (2013.01); *C02F 2101/38* (2013.01);
(Continued)

(58) Field of Classification Search
None
See application file for complete search history.

(56) References Cited

U.S. PATENT DOCUMENTS 3,632,314 A * 1/1972 Torrence ............. C01B 17/0404
                                                    423/573.1
3,789,110 A * 1/1974 Ball ....................... C01B 17/60
                                                    423/244.03

(Continued)

FOREIGN PATENT DOCUMENTS

| JP | 08-081210 | 3/1996 |
| WO | WO 2009-140033 | 11/2009 |
| WO | WO 2011/156483 | 12/2011 |

OTHER PUBLICATIONS

International Search Report for PCT International Application No. PCT/US2012/052502 Mailed on Mar. 13, 2013, 5 pages.

(Continued)

*Primary Examiner* — Chester Barry
(74) *Attorney, Agent, or Firm* — Julie Lapos-Kuchar

(57) ABSTRACT

Described herein is a filtration medium comprising a carbon substrate having a surface of $CO_xE_y$, wherein E is selected from at least one of S, Se, and Te; and wherein x is no more than 0.1 and y is 0.005 to 0.3; a filtration device comprising the filtration medium; and methods of removing chloramines from aqueous solutions.

9 Claims, 3 Drawing Sheets

Related U.S. Application Data

(60) Provisional application No. 61/533,297, filed on Sep. 12, 2011.

(51) Int. Cl.

| | |
|---|---|
| B01J 20/28 | (2006.01) |
| B01J 20/30 | (2006.01) |
| B01J 20/32 | (2006.01) |
| C01B 21/09 | (2006.01) |
| B01J 20/26 | (2006.01) |
| C02F 101/12 | (2006.01) |
| C02F 101/38 | (2006.01) |
| C02F 101/36 | (2006.01) |
| C02F 103/02 | (2006.01) |

(52) U.S. Cl.
CPC ...... *C02F 2103/02* (2013.01); *C02F 2303/02* (2013.01); *C02F 2303/185* (2013.01); *C02F 2305/02* (2013.01)

(56) References Cited

U.S. PATENT DOCUMENTS

| | | | |
|---|---|---|---|
| 4,143,214 | A | 3/1979 | Chang |
| 4,624,937 | A | 11/1986 | Chou |
| 4,634,937 | A | 1/1987 | Haferl |
| 4,886,649 | A | 12/1989 | Ismagilov |
| 5,338,458 | A | 8/1994 | Carrubba |
| 5,356,849 | A | 10/1994 | Matviya |
| 5,504,050 | A | 4/1996 | Hayden |
| 6,699,393 | B2 | 3/2004 | Baker |
| 6,706,194 | B2 | 3/2004 | Baker |
| 7,361,280 | B2 | 4/2008 | Baker |
| 8,206,627 | B2 | 6/2012 | Stouffer |
| 2008/0119355 | A1* | 5/2008 | Ohno ............ C04B 35/80 502/340 |
| 2008/0207443 | A1 | 8/2008 | Gadkaree et al. |
| 2009/0039028 | A1 | 2/2009 | Eaton |
| 2010/0004119 | A1* | 1/2010 | Gadkaree ............ B01D 53/64 502/84 |
| 2010/0213104 | A1 | 8/2010 | Hughes |

OTHER PUBLICATIONS

Asano, "Formation and Properties of Plasma-Polymerized Carbon Disulfide Films", *Japanese Journal of Applies Physics*, vol. 22, No. 10, pp. 1618-1622, (1983).
Blayden, "Solid Complexes of Carbon and Sulphur—I. Sulphurised Polymer Carbons", *Carbon*, vol. 5, pp. 533-544 (1967).
Bock, "Gas-Phase Reactions. 55. O=C=C=C=S: Synthesis and PE Spectrum", *Journal of American Chemical Society*, vol. 108, No. 24, pp. 7844-7846, (1986).
Cal, "High temperature hydrogen sulfide adsorption of activated carbon II. Effects of gas temperature, gas pressure and sorbent regeneration", *Carbon*, vol. 38, pp. 1767-1774 (2000).
Chang, "Preparation and Characterization of Carbon-Sulfur Surface Compounds", *Carbon*, vol. 19, pp. 175-186 (1981).
Changxian, "Coal Activated Carbon", China Coal Industry Publishing House, Jul. 31, 1983, p. 151-155.
Chou, "Solvatothermal Routes of Poly(carbon monosulfide)s Using Kinetically Stabilized Precursors", *Journal of American Chemical Society*, vol. 119, pp. 4537-4538, (1997).
Doxsee, "New Carbon Sulfides Based on 4,5-Dimercapto-1,2-dithiole-3-thione($\beta$-$C_3S_5^{2-}$): [$C_3S_5$]$_n$, $C_6S_8$, and $C_5S_7$", *Inorganic Chemistry*, vol. 32, pp. 5467-5471, (1993).
Feng, "Sulfurization of carbon surface for vapor phase mercury removal—I: Effect of termperature and sulfurization protocol", *Carbon*, vol. 44, pp. 2990-2997 (2006).
Figueiredo, "Modificationof the surface chemistry of activated carbons", *Carbon*, vol. 37, pp. 1379-1389 (1999).
Flammang, "Formation of thiophenethiols by flash vacuum pyrolysis of 1,6,6a$\lambda^4$-trithiapentalenes", *Journal of the Chemical Society, Perkin Transactions 2*, pp. 1261-1264, (1997).
Galloway, "Binary Carbon Sulfides Based on the $\alpha$-$C_3S_5$ Subunit and Related C—S—O, C—S—Cl, and C—S—N Compounds", *Inorganic Chemistry*, vol. 33, No. 20, pp. 4537-4544, (1994).
Hsi, "Effects of Sulfur Impregnation Temperature on the Properties and Mercury Adsorption Capacities of Activated Carbon Fibers (ACFs)", *Environmental Science Technology*, vol. 35, No. 13, pp. 2785-2791 (2001).
Jacangelo, "Oxidation of Sulfhydryl Groups by Monochloramine", *Water Res.*, vol. 21, pp. 1339-1344 (1987).
Komorita, "Technical Note: Monochloramine Removal From Water by Activated Carbon", *J. Am. Water Works Assoc.*, vol. 77, No. 1, pp. 62-64 (1985).
Krishnan, "Uptake of Heavy Metals in Batch Systems by Sulfurized Steam Activated Carbon Prepared from Sugarcane Bagasse Pith", *Industrial & Engineering Chemistry Research*, vol. 41, No. 20, pp. 5085-5093 (2002).
Krivoshei, "Conjugated Inorganic Carbon-based Polymers", *Russian Chemical Reviews*, vol. 50, No. 4, pp. 397-408, (1981).
Kurmaev, "Interlayer conduction band states in graphite-sulfur composites", *Physical Review B*, vol. 66, pp. 193402.1-193402.3 (2002).
Liang, "Mesoporous Carbon Materials: Synthesis and Modification", *Angew. Chem. Int. Ed.*, vol. 47, pp. 3696-3717 (2008).
Liu, "Optimization of High Temperature Sulfur Impregnation on Activated Carbon for Permanent Sequestration of Elemental Mercury Vapors", *Environmental Science & Technology*, vol. 34, pp. 483-488 (2000).
Lopez-Gonzalez, "Effect of Carbon-Oxygen and Carbon-Sulphur Surface Complexes on the Adsorption of Mercuric Chloride in Aqueous Solutions by Activated Carbons", *J. Chem. Tech. Biotechnol.*, vol. 32, pp. 575-579 (1982).
Macías-García, "Adsorption of cadmiun by sulphur dioxide treated activated carbon", *Journal of Hazardous Materials*, vol. B103, pp. 141-152 (2003).
Maier, "Thioxoethenylidene $C_2S$: A Matrix-Spectroscopic Study", *European Journal of Organic Chemistry*, pp. 4197-4202, (2004).
Müller, "Bis-substituted Tetrathiapentalenes—Novel Building Blocks for Extended Tetrathiafulvalenes and Conducting Polymers" *Tetrahedron Letters*, vol. 38, No. 18, pp. 3215-3218 (1997).
Pedersen, "3,6-Dihydro[1,2]dithiolo[4,3-c][1,2]dithiole-3,6-dithione and oxoanalogues: a comparative study of the thermal (FVP) and electron ionization (EI) induced fragmentations", *Journal of the Chemical Society, Perkin Transactions 2*, pp. 1403-1406 (1998).
Petit, "The role of sulfur-containing groups in ammonic retention on activated carbons", *Carbon*, vol. 48, pp. 654-667 (2010).
Petit, "The effect of oxidation on the surface chemistry of sulfur-containing carbons and their arsine adsorption capacity", *Carbon*, vol. 48, pp. 1779-1787 (2010).
Plank, "Thiolation of single-wall carbon nanotubes and their self-assembly", *Applied Physics Letters*, vol. 85, No. 15, pp. 3229-3231 (2004).
Puri, "Carbon-Sulphur Surface Complexes on Charcoal", *Carbon*, vol. 9, pp. 123-134 (1974).
Schumaker, "Thiapen Chemistry.2.Synthesis of 1,3.4.6-Tetrathiapentalene-2,5-dione", *Journal of American Chemical Society*, vol. 99, No. 16, pp. 5521-5522, (1977).
Sülzle, "Experimental Evidence for the Existence of Polycarbon Oxide Sulfides O($C_n$)S (n=3-5) in the Gas Phase", *Journal of American Chemical Society*, vol. 113, No. 1, pp. 48-51 (1991).
Wang, "Adsorption of Aqueous Hg(II) by Sulfur-Impregnated Activated Carbon", *Environmental Engineering Science*, vol. 26, No. 12, pp. 1693-1699 (2009).
Wepasnick, "Surface and structural characterization of multi-walled carbon nanotubes following different oxidative treatments", *Carbon*, vol. 49, pp. 24-36 (2011).
Yamada, "Synthesis of new TTF(s)-fused donors and electrical conductivities of their radical cation salts", *Synthetic Metals*, vol. 86, pp. 1823-1824 (1997).

\* cited by examiner

FILTRATION MEDIUM COMPRISING A CARBON OXYCHALCOGENIDE

CROSS REFERENCE TO RELATED APPLICATIONS

This application is a continuation of U.S. application Ser. No. 14/342,784, filed Mar. 4, 2014, now U.S. Pat. No. 9,403,696, granted on Aug. 2, 2016, which is a national stage filing under 35 U.S.C. 371 of PCT/US2012/052502, filed Aug. 27, 2012, which claims priority to U.S. Application No. 61/533,297, filed Sep. 12, 2011, the disclosure of which is incorporated by reference in its/their entirety herein.

TECHNICAL FIELD

A composition having a surface comprising a carbon oxychalcogenide is described, which is used as a filtration medium, along with methods of making and use.

BACKGROUND

Chloramine is commonly used in low concentration as a secondary disinfectant in municipal water distribution systems as an alternative to chlorination with free chlorine. Concerns over taste and odor of chloramine treated water have led to an increase in the demand for water filters with chloramine removal capabilities.

Carbon particles, such as activated carbon particles, have been used to remove chloramine from aqueous streams. Improvements in removal of chloramine can be achieved by reducing the mean particle diameter of the carbon and by increasing the carbon bed contact time. Although parameters such as contact time and mean particle diameter are known to affect chloramine removal efficiencies, removal performance is neither well understood nor particularly effective.

U.S. Pat. No. 5,338,458 (Carrubba et al.) discloses an improved process for the removal of chloramine from gas or liquid media by contacting the media with a catalytically-active carbonaceous char.

U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char.

SUMMARY

There is a desire to provide a filtration medium, which is less expensive and/or more efficient at the removal of chloramine than currently available filtration media. In some instances, there is also a desire to provide a carbon-based system, which is in the form of a solid block activated carbon to remove chloramine. In other instances, there is a desire to have a granular material that may be used in a packed bed. In still other instances, there is a desire to provide a material that may be used in a web-form.

In one aspect, a filtration device is provided comprising a fluid conduit fluidly connecting a fluid inlet to a fluid outlet; and a filter medium disposed in the fluid conduit; the filter medium comprising a carbon substrate having a surface of $CO_xE_y$, wherein E is selected from at least one of S, Se, and Te; and wherein x is no more than 0.1, and y is 0.005 to 0.3.

In another aspect, a water filtration device is provided comprising a liquid conduit fluidly connecting a liquid inlet to a liquid outlet; and a filter medium disposed in the fluid conduit; the filter medium comprising a carbon substrate having a surface of $CO_xE_y$, wherein E is selected from at least one of S, Se, and Te; and wherein x is no more than 0.1, and y is 0.005 to 0.3.

In yet another aspect, a method from removing chloramine from aqueous solutions is provided comprising: providing an aqueous solution comprising chloramine and contacting the aqueous solution with a composition comprising a carbon substrate having a surface of $CO_xE_y$, wherein E is selected from at least one of S, Se, and Te; and wherein x is no more than 0.1, and y is 0.005 to 0.3.

In still another aspect, a method of making a carbon oxychalcogenide is provided comprising: contacting a carbon substrate with a chalcogen-containing compound; and heating to a temperature between 300 to 1200° C. in the presence of oxygen, wherein the form of oxygen is selected from the group consisting of: an inert diluent gas, water, steam, or combinations thereof.

In yet another aspect, a method of making a carbon oxychalcogenide is provided comprising: contacting a carbon substrate with an oxidizing agent to form an oxidized carbon substrate; providing a chalcogen-containing compound; and contacting the oxidized carbon substrate and the chalcogen-containing compound and heating to a temperature between 300 to 1200° C.

In another aspect, a composition is provided comprising a carbon substrate having a surface comprising $CO_xE_y$, wherein C, O, and E chemically interact; wherein E is selected from at least one of S, Se, and Te; and wherein x is 0.01 to 0.1, and y is 0.005 to 0.3.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

Figure 1:
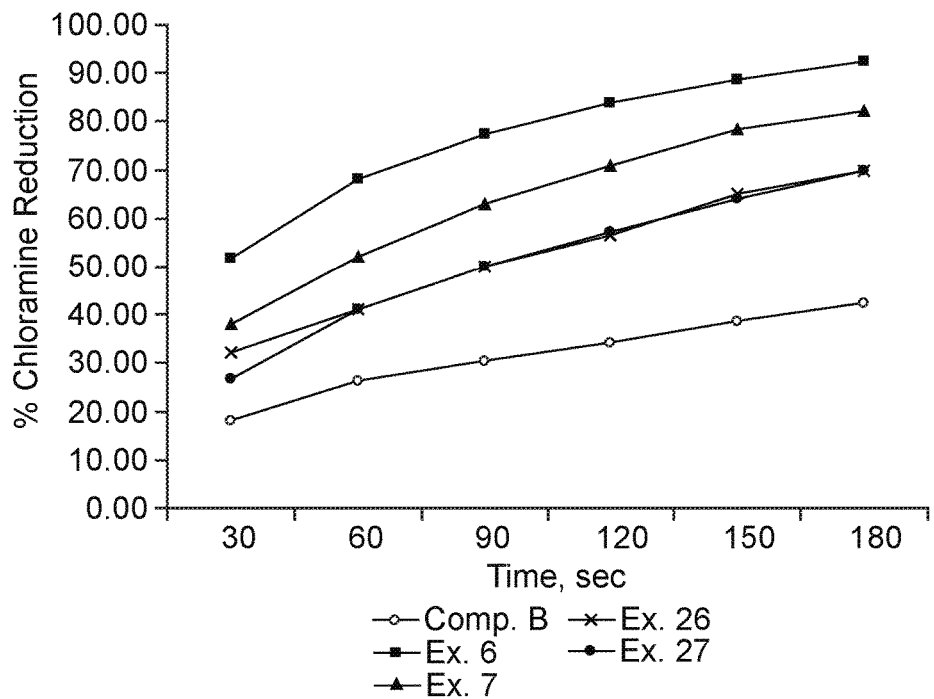
FIG. 1 is a chart of the percent chloramine reduction versus time for Comparative Example B, Examples 6-7 and Examples 26-27.

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed to a carbon substrate comprising a surface of a carbon oxychalcogenide. It has been found that such compositions may be useful for the removal of chloramine from aqueous solutions.

Carbon has several allotropes, including diamond, graphite, and amorphous carbon. In one embodiment, the carbon substrate comprises a substantial amount of $sp^2$ hybridized carbon. In other words, the carbon substrate has no more than 20%, 15%, 12% or even 10% $sp^3$ hybridized carbon. As the $sp^3$ hybridized carbon content increases, the $sp^2$ hybridized carbon substrate progressively changes into a dense, isotropic network of tetrahedral carbon.

The morphology of the carbon substrate is not particularly limited and may include a non-particulate, a particulate, or an aggregate. Exemplary morphologies include: a carbon block, a carbon monolith, foams, films, fibers, nanotubes, and nano-onions. A non-particulate is a substrate that is not composed of discernable, distinct particles. A particulate substrate is a substrate that has discernable particles, wherein the particle may be spherical or irregular in shape and has an average diameter of at least 0.1, 1, 5, 10, 20, or even 40 micrometers (μm) to at most 75 μm, 100 μm, 500 μm, 1 millimeter (mm), 2 mm, 4 mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology the carbon substrate will be selected based on the application. For example, particulate with a large particle size is desirable when the compositions of the present disclosure are used in applications requiring low pressure drops such as in beds through which gases or liquids are passed. Granular activated carbon available under the trade designation "RGC" by Mead Westvaco Corp, Richmond, Va. may be preferred in water treatment; while activated coconut carbon (20×25 mesh) available under the trade designation "KURARAY GG" by Kuraray Chemical Co., LTD, Okayama, Japan may be preferable for air purification applications on account of the lower pressure drop associated with its larger particle size; and a very fine particle sized carbon black available under the trade designation "BLACK PEARLS 2000" by Cabot Corp. Alpharetta, Ga. may be preferable for electrocatalysis on account of its higher electrical conductivity.

The size of the pores of the carbon substrate can be selected based on the application. The carbon substrate may be microporous carbon, macroporous carbon, mesoporous carbon, or a mixture thereof.

Particularly useful are carbon substrates that are substantially disordered and have high surface areas (e.g., at least 100, 500, 600 or even 700 $m^2/g$; and at most 1000, 1200, 1400, 1500, or even 1800 $m^2/g$ based on BET (Brunauer Emmet Teller method) nitrogen adsorption). As used herein, substantially disordered means that the carbon substrate has in-plane domain sizes of about 10-50 Å (Angstrom).

In one embodiment, the carbon substrate is comprised of activated carbon, in other words carbon that has been processed to make it highly porous (i.e., having a large number of pores per unit volume), which thus, imparts a high surface area.

In the present disclosure, the surface of the carbon substrate comprises $CO_xE_y$, wherein E is sulfur, selenium, tellurium, or combinations thereof; wherein x is no more than 0.1 and y is 0.005 to 0.3. In one embodiment, x is 0 or is at least 0.005, 0.01, 0.02, 0.03, 0.04, or even 0.05; and is at most 0.07, 0.08, 0.09, 0.1, 0.12, 0.15, or even 0.2. In one embodiment, y is at least 0.001, 0.005, 0.01, 0.02, 0.03, 0.04, 0.05, or even 0.06; and at most 0.12, 0.14, 0.15, 0.16, 0.18, 0.2, 0.22, 0.25, 0.3, 0.35, or even 0.4.

In one embodiment, the carbon substrate has a surface consisting essentially of $CO_xE_y$, meaning that the surface necessarily includes carbon, oxygen, and E and may also include other atoms so long as the other atoms do not materially affect the basic and novel properties of the invention. In other words, besides carbon, oxygen, and the chalcogen, the surface of the substrate comprises less than 10% or even less than 5% total of other atoms. These other atoms may originate in the starting materials. For example, a carbon substrate, prior to reactions as described in this disclosure, may contain potassium or minor amounts of other elements, which are not removed during manufacturing and thus, are present in the final product.

If sulfur is used as the chalcogenide, the sulfur may be present in amounts greater than 1.2, 1.3, 1.5, 1.8, 2.0, 4.0, 6.0, 8.0 or even 10.0 mass % sulfur based on the total mass of the carbon substrate.

In one embodiment, the compositions of the present disclosure comprise less than 0.90, 0.80, 0.70, 0.50, 0.30, 0.10, 0.05, 0.01, or even 0.005 mass % nitrogen based on the total mass of the carbon substrate.

In one embodiment, the compositions of the present disclosure are substantially free of hydrogen, comprising less than 0.40, 0.30, 0.20, 0.10, 0.05, or even 0.01 mass % hydrogen based on the total mass of the carbon substrate.

The compositions of the present disclosure are made by exposing a carbon substrate to a chalogen chalcogen or chalcogen-containing compound, and optionally oxygen. The chalcogen, as used herein to refer to sulfur, selenium, tellurium, is reacted onto the carbon substrate, by exposing a solid, liquid, or gas form of the chalcogen or chalcogen-containing compound to the carbon substrate under heating conditions.

Useful sulfur-containing compounds include, but are not limited to elemental sulfur, $SO_2$, $SOCl_2$, $SO_2Cl_2$, $CS_2$, COS, $H_2S$, and ethylene sulfide.

Useful selenium compounds include but are not limited to elemental selenium, $SeO_2$ and $SeS_2$.

Useful tellurium compounds include but are not limited to elemental tellurium, $TeO_2$ and $(HO)_6Te$.

In one embodiment, the sulfur, selenium, and tellurium compounds may be used in combination with one another to generate a carbon oxychalcogenide containing more than one chalcogenide element, for example, sulfur and selenium.

In addition to a chalcogen, the surface of the carbon substrate also comprises oxygen. The carbon substrate, as received, may contain chemically significant amounts of oxygen attached to surface carbon atoms. For example, according to X-ray photoelectron spectroscopic (XPS) analysis, RGC contains about 2.9 atomic percent of oxygen. This amount of oxygen may be sufficient for the present disclosure but, when higher amounts of surface oxygen are desired, additional oxygen may be incorporated into the carbon.

In one embodiment, additional oxygen may be added to the carbon substrate before exposure to the chalcogen-containing compound. For example, the carbon substrate can be heated in air or treated with aqueous nitric acid, ammonium persulfate, ozone, hydrogen peroxide, potassium permanganate, Fenton's Reagent, or other well known oxidizing agents.

In another embodiment, additional oxygen can be incorporated into the compositions of the present disclosure by carrying out the reaction between the carbon substrate and the chalcogen-containing compound in the presence of air or water. The amount of air used must be limited to prevent combustion of the carbon. Additional oxygen may also be supplied by addition of water or steam, which can be added during the heating reaction or may be present on the surface of the carbon substrates, such as in the case of high surface area carbonaceous materials, particularly hydrophilic oxidized carbons, which chemisorb water. Oxygen may be added during the heating reaction in the form of dioxygen, sulfur dioxide, carbon dioxide, or combinations thereof.

In addition to adding an oxygen source during heating of the carbon and the chalcogen, in an alternative embodiment, the heating is conducted in the absence of added oxygen.

Reactions of elemental carbon typically exhibit large activation energies and so are conducted at high temperature. Reactions used to introduce chalcogens and optionally oxygen into the carbon substrate surface may be conducted at a temperature of at least 200, 250, 300, 400, or even 500° C.; and at most 650, 700, 800, 900, 1000, 1200, or even 1400° C. As will be shown in the examples, in one embodiment, as the reaction temperature increases the composition of the present disclosure becomes more efficient at the removal of chloramine.

The thermal reaction may occur in air. However, to control combustion, it is possible to carry out the thermal reaction under vacuum; with a purge, such as a nitrogen purge; or in an inert atmosphere where the air is pulled from the reaction vessel using a vacuum and then dry nitrogen is used to back-fill the reaction vessel.

The chalcogen-containing compound may be used in the solid, liquid or gas form. Reaction temperatures, which are above the boiling point of the chalcogen-containing compounds are used, resulting in solid-gas reaction chemistry.

In one embodiment, the carbon substrate is wetted with a liquid chalcogen-containing compound and then exposed to the reaction temperature and optional oxygen to form the carbon oxychalcogenide surface. These reactions occur at the surface of the carbon substrate. In the case of a porous carbon substrate, the carbon oxychalcogenide may coat (or cover) the surface of the pores of the porous carbon substrate.

The compositions of the present disclosure are obtained via solid-gas (or solid-vapor) chemistry. In reactions of this class, only the outer portions of the carbon substrate are exposed to the reactive gas. Such reactions can become self-limiting in that an overlayer of product inhibits inward diffusion of the gas. In such a case, the new compounds that form are confined to regions near the surface and comprise a surface compound. Generally, this means that reactions occur at depths of 10 nanometers (nm) or less on the carbon substrate to form the $CO_xE_y$ coating.

When the carbon substrate is a large particle, a core-shell structure results, where the core is the carbon substrate, which is covered by a shell or second layer comprising the carbon oxychalcogenide.

Because the reaction disclosed herein is a surface reaction, when the carbon material is in the form of small particles with high surface area (e.g., RGC powder nominally −325 mesh, having a nominal surface area of 1400-1800 $m^2/g$), then the surface and interior of the particle may become coextensive. In one instance there may be no apparent chemical distinction between the outer surface and the interior of the particle. In another instance, the chalcogen content on the bulk can approach or even exceed that on the surface.

The solid-vapor process of this disclosure permits penetration of small molecule reactants into micropores and niches formed by highly irregular surfaces. This results in an advantageous, even distribution of chalcogen.

Because not all of the chalcogenide from the chalcogen-containing compound is incorporated into the carbon substrate surface (e.g., some may be converted to COE or $H_2E$), it is important to analyze the resulting composition to determine the atom fraction of carbon, oxygen, and chalcogen on the carbon substrate surface.

In the present disclosure, the atom fraction of carbon (C), oxygen (O), and chalcogen (E) on the carbon substrate surface is shown as $CO_xE_y$, where in one embodiment, x is 0 or is at least 0.005, 0.01, 0.02, 0.03, 0.04, or even 0.05; and at most 0.07, 0.08, 0.09, 0.1, 0.12, 0.15, or even 0.2; and y is at least 0.001, 0.005, 0.01, 0.02, 0.03, 0.04, 0.05, or even 0.06; and is at most 0.12, 0.14, 0.15, 0.16, 0.18, 0.2, 0.22, 0.25, 0.3, 0.35, or even 0.4.

In one embodiment of the present disclosure, the carbon, oxygen, and chalcogen of the disclosed composition chemically interact with one another, meaning, that these elements may be combined chemically (i.e., covalent chemical bonding between contiguous elements) or there may be weaker interactions between non-contiguous elements, such as hydrogen bonding.

Based on the analysis of compositions of the present disclosure, in at least one embodiment, the oxygen and chalcogen are combined chemically on the surface of the carbon substrate. The oxygen and carbon are an integral part of the surface of the carbon substrate and are not easily removed by heating to 400° C. The nature of the structure and bonding of the carbon oxychalcogenides is complex. Carefully deconvoluted XPS (X-ray photoelectron spectroscopy) spectra of the resulting compositions of the present disclosure reveal that sulfur is in four different chemical environments with $S2p_{3/2}$ binding energies of about 162.0, 164.3, 165.8 and 168.9 eV [C(1s)≡285.0 eV]. They therefore contain chemically combined sulfur in three formal valence states [S(VI), S(IV) and S(II)] and four different chemical environments. These chemical environments are: (1) S(VI) as in $SO_4^{2-}$ or organic sulfones, C—$SO_2$—C (2) S(IV) as in organic sulfoxides, C—SO—C, (3) S(II) as in thiophene and (4) S(II) as in organic sulfides, C—S—C or disulfides, C—S—S—C.

In one embodiment, the compositions of the present disclosure have high thermal stability. For example, with carbon oxysulfides, significant weight loss under nitrogen does not begin until about 200° C., well above the boiling point of sulfur, indicating that the compositions of the present disclosure are not mere physical mixtures of starting materials.

By using a solid-vapor process to incorporate the carbon oxychalcogenide surface onto the carbon substrate, several advantages may be realized. Because the reaction may be solventless or at least free of organic solvent, no drying operation is needed to isolate the product. Further, there are generally no non-volatile by-products that remain to clog small pores in the solid. If no solvent is used, the process as described herein can be envisioned to run as a continuous process, which can reduce cost and/or increase throughput.

In one embodiment, the composition of the present disclosure may be used to remove chloramines.

In one embodiment, the composition of the present disclosure may be used to remove chloramines from a fluid stream, particularly an aqueous fluid stream. Chloramines are formed from the aqueous reaction between ammonia and chlorine (hypochlorite). Thus, adding ammonia ($NH_3$) to a chlorination system converts chlorine to chloramines. Specifically, monochloramine, hereafter referred to as "chloramine," in low concentrations arise from the disinfection of potable water sources.

Although not wanting to be bound by theory, it is believed that the carbon, chalcogen, oxygen atoms on the surface of the carbon substrate form particular chemical moieties, such that the chalcogen is present in one or more forms that can be oxidized by chloramines. This results in the destruction and removal of chloramines.

In one embodiment, the composition of the present disclosure may be used as a filtration medium. Because of the ability of the compositions of the present disclosure to remove chloramine, the compositions of the present disclosure may be used as a filtration media. Filtration methods as known in the art can be used.

The carbon substrates comprising a surface of carbon oxychalcogenides may be used either alone, or mixed with inert diluents or functionally active materials such as adsorbents. For example the oxysulfide prepared from RGC carbon may be mixed intimately or layered in beds with carbon that has higher capacity for adsorption of volatile organic compounds. In this way, an adsorbent system with more than one functionality can be produced.

The composition of the present disclosure may be used in a powdered form, a granular form, or shaped into a desired form. For example, the composition of the present disclosure may be a compressed blend of the carbon substrates comprising the carbon oxychalcogen and a binder material, such as a polyethylene, e.g., an ultra high molecular weight PE, or a high-density polyethylene (HDPE). In another embodiment, the composition of the present disclosure may be loaded into web, such as a blown microfiber, which may or may not be compacted such as described in U.S. Publ. No. 2009/0039028 (Eaton et al.) herein incorporated in its entirety.

In one embodiment, the carbon substrate comprising the carbon oxychalcogenide may be disposed in a fluid conduit, wherein the fluid conduit has a fluid inlet and a fluid outlet, with the filtration media (e.g., carbon substrate comprising the carbon oxychalcogenide) disposed therebetween. A chloramine-containing solution may then be passed from the fluid inlet into the fluid conduit to contact the filtration media. The filtrate (solution passing out of the fluid out) should contain less than 1, 0.5, 0.1, or even less than 0.05 ppm (parts per million) chloramines.

Embodiments of the present disclosure include:

Item 1. A filtration device comprising a fluid conduit fluidly connecting a fluid inlet to a fluid outlet; and a filter medium disposed in the fluid conduit; the filter medium comprising a carbon substrate having a surface of $CO_xE_y$, wherein E is selected from at least one of S, Se, and Te; and wherein x is no more than 0.1, and y is 0.005 to 0.3.

Item 2. The filtration device of item 1, wherein x is 0.01 to 0.1.

Item 3. The filtration device of any one of the previous items, wherein E is sulfur and the sulfur is chemically combined with carbon.

Item 4. The filtration device of any one of the previous items, wherein the filter medium comprises the carbon substrate having a surface of $CO_xE_y$ and a binder.

Item 5. The filtration device of any one of items 1-3, wherein the filter medium comprises the carbon substrate having a surface of $CO_xE_y$ and a web.

Item 6. A water filtration device comprising a liquid conduit fluidly connecting a liquid inlet to a liquid outlet; and a filter medium disposed in the fluid conduit; the filter medium comprising a carbon substrate having a surface of $CO_xE_y$, wherein E is selected from at least one of S, Se, and Te; and wherein x is no more than 1, and y is 0.005 to 0.3.

Item 7. The water filtration device of item 1, wherein x is 0.01 to 0.1.

Item 8. The water filtration device of any one of items 6-7, wherein E is sulfur and the sulfur is chemically combined with carbon.

Item 9. The water filtration device of items 6-8, wherein the filter medium comprises the carbon substrate having a surface of $CO_xE_y$ and a binder.

Item 10. The water filtration device of any one of items 6-8, wherein the filter medium comprises the carbon substrate having a surface of $CO_xE_y$ and a web.

Item 11. A method for removing chloramine from aqueous solutions comprising: providing an aqueous solution comprising chloramine and contacting the aqueous solution with a composition comprising a carbon substrate having a surface of $CO_xE_y$, wherein E is selected from at least one of S, Se, and Te; and wherein x is no more than 0.1, and y is 0.005 to 0.3.

Item 12. The method for removing chloramine from aqueous solutions of item 11, wherein x is 0.01 to 0.1.

Item 13. The method for removing chloramine from aqueous solutions of any one of items 11-12, wherein E is sulfur and the sulfur is chemically combined with carbon.

Item 14. The method for removing chloramine from aqueous solutions of any one of items 11-13, wherein the carbon substrate is a microporous, mesoporous, macroporous carbon, or combination thereof.

Item 15. A method of making a carbon oxychalcogenide comprising: contacting a carbon substrate with a chalcogen-containing compound; and heating to a temperature between 300 to 1200° C. in the presence of oxygen, wherein the form of oxygen is selected from the group consisting of: an inert diluent gas, water, steam, or combinations thereof.

Item 16. The method of item 15, wherein the form of oxygen is selected from the group consisting of dioxygen, sulfur dioxide, water, carbon dioxide, or combinations thereof.

Item 17. The method of any one of items 15-16 wherein the chalcogen-containing compound is selected from the group consisting of: elemental sulfur, $SO_2$, $CS_2$, $H_2S$, ethylene sulfide, elemental selenium, $SeO_2$ and $SeS_2$, elemental tellurium, $TeO_2$, $(HO)_6Te$, and combinations thereof.

Item 18. A method of making a carbon oxychalcogenide comprising: contacting a carbon substrate with an oxidizing agent to form an oxidized carbon substrate; providing a chalcogen-containing compound; and contacting the oxidized carbon substrate and the chalcogen-containing compound and heating to a temperature between 300 to 1200° C.

Item 19. The method of item 18 wherein the oxidizing agent is selected from at least one of: air, ammonium persulfate, aqueous nitric acid, ozone, hydrogen peroxide, potassium permanganate, and Fenton's Reagent.

Item 20. The method of any one of items 18-19 wherein the chalcogen-containing compound is selected from the group consisting of: elemental sulfur, $SO_2$, $CS_2$, $H_2S$, $C_2H_4S$, elemental selenium, $SeO_2$ and $SeS_2$, elemental tellurium, $TeO_2$, $(HO)_6Te$, and combinations thereof.

Item 21. A composition comprising a carbon substrate having a surface comprising $CO_xE_y$, wherein C, O, and E chemically interact; wherein E is selected from at least one of S, Se, and Te; and wherein x is 0.01 to 0.1, and y is 0.005 to 0.3.

Item 22. The composition of item 21 wherein E is sulfur and the sulfur is chemically combined with carbon.

Item 23. The composition of any one of items 21-22, wherein the carbon substrate is a microporous, mesoporous or macroporous carbon.

Item 24. The filtration device of any one of items 1-5, wherein the carbon substrate comprises less than 0.90, mass % nitrogen based on the total mass of the carbon substrate.

Item 25. The filtration device of any one of items 1-5, wherein the carbon substrate comprises greater than 2.0 mass % sulfur based on the total mass of the carbon substrate.

Item 26. The water filtration device of any one of items 6-10, wherein the carbon substrate comprises less than 0.90, mass % nitrogen based on the total mass of the carbon substrate.

Item 27. The water filtration device of any one of items 6-10, wherein the carbon substrate comprises greater than 2.0 mass % sulfur based on the total mass of the carbon substrate.

Item 28. The method of any one of items 11-20, wherein the carbon substrate comprises less than 0.90, mass % nitrogen based on the total mass of the carbon substrate.

Item 29. The method of any one of items 11-20, wherein the carbon substrate comprises greater than 2.0 mass % sulfur based on the total mass of the carbon substrate.

Item 30. The composition of any one of items 21-23, wherein the carbon substrate comprises less than 0.90, mass % nitrogen based on the total mass of the carbon substrate.

Item 31. The composition of any one of items 21-23, wherein the carbon substrate comprises greater than 2.0 mass % sulfur based on the total mass of the carbon substrate.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: cc=cubic centimeter, g=gram, hr=hour, in=inch, kg=kilograms, min=minutes, mol=mole; M=molar, cm=centimeter, mg/L=milligrams per liter; mm=millimeter, ml=milliliter, L=liter, N=normal, psi=pressure per square inch, MPa=megaPascals, and wt=weight.

Methods

Apparent Density Determination

The apparent density of a carbon substrate sample (prepared according to Comparative Examples or the Examples according to the disclosure) was determined by tapping a weighed sample in a graduated cylinder until closest packing was achieved. The closest packing was deemed to occur when tapping did not produce a further decrease in volume of the carbon substrate sample.

Preparing Carbon Blocks 40 cm$^3$ of the carbon material (either the carbon-oxychalcogenide sample or the carbon substrate) was added into a blender. The volume of the carbon material was determined at the maximum uncompressed density. 40 cc of ultra high molecular weight polyethylene (UHMWPE) powder (available under the trade designation "GUR UHMW-PE 2126" from Ticona North America, Florence, Ky.) at its maximum uncompressed density was measured and placed into the blender. The carbon material and UHMWPE were blended for 3 minutes. The mixture was then quantitatively transferred to a cylindrical shaped mold with a hollow cylindrical core having the dimensions of 1.35 in. (34.3 mm) outer diameter, 0.375 in. (9.5 mm) inner diameter, and 3.6 in. (91.4 mm) length. The mold was filled using an impulse filling as described in U.S. Pat. No. 8,206,627 (Stouffer et al.) to maximum uncompressed density. The mold was covered and then heated in a convection oven at 180° C. for 50 minutes. After heating, the mold was immediately compressed with a piston to a fixed block length of 3.1 in. (78.7 mm). The mold was cooled to room temperature and the resulting carbon block was removed from the mold. Endcaps were applied to the carbon block using a hot melt glue to form an end-blocked carbon sample.

Chloramine Test

The chloramine content of water samples was determined from the total chlorine content in the samples. Total chlorine (OCl$^-$ and chloramines) concentration was measured by the DPD Total Chlorine Method, Hach Method 8167, which Hach Company claims to be equivalent to USEPA Method 330.5. The free chlorine (OCl—) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Colo.

Chloramine Preparation 3 ppm chloramine was prepared by adding the appropriate amount of commercial bleach (5.25% NaOCl) to deionized water. While stirring, 1.5 equivalents of a solution of ammonium chloride in water was added to the bleach solution and stirred for 1 hour. The pH was adjusted to 7.6 by the addition of NaOH or HCl and tested using a pH meter (obtained from Thermo Fisher Scientific, Inc., Waltham, Mass., under the trade designation "ORION 3-STAR").

Chloramine Removal Test

An aqueous chloramine test solution was prepared comprising 3 ppm NH$_2$Cl (prepared as described above) at a pH 7.6 at 27° C. Immediately prior to the test, the initial total chlorine content of the aqueous chloramine test solution was measured as described in the Chloramine Test above. With continuous stirring, a 1.5 mL aliquot of a carbon substrate sample (i.e. a sample prepared according to Comparative Examples or the Examples according to the disclosure) was added to the aqueous chloramine test solution. The mass of the aliquot of the carbon substrate sample was determined based on the apparent density of the carbon substrate determined as described above (which was about 0.3 g/mL). Immediately after the mixing, a timer was started. After 30 sec, a 25 mL-aliquot of mixture was removed and within 5 sec of removal, the mixture was passed through a 1-micrometer syringe filter to remove suspended solids. The chloramine content of the filtered aliquot was measured within 30 sec of taking the 25-mL aliquot as described above. Aliquots from the mixture were taken periodically over the course of 3 minutes and analyzed using the Chloramine Test as described above. The efficiency of the chloramine removal is reported as the % chloramine reduction determined by the equation:

$$\left(1 - \frac{[NH2Cl]\,filtered\,aliquot}{[NH2Cl]\,initial}\right) \times 100$$

Chloramine Removal Test 2 (Flow-System Method)

Chloramine capacity in a flow-through system was evaluated per a method based on the NSF/ANSI Standard 42 (Drinking Water Treatment—Aesthetic Effects) for chloramine reduction. A 3 mg/L aqueous chloramine test solution was prepared having a pH of 9.0±0.25; total dissolved solids of 200-500 mg/L; a hardness less than 170 mg/L as $CaCO_3$; turbidity of less than 1 Nephelometric Turbidity Units; and a temperature of 20±3° C. The chloramine concentration was controlled at 2.7-3.3 mg/L by the addition of a sodium hypochlorite solution and then addition of an ammonium chloride solution. The pH was controlled by adding sodium hydroxide as needed.

An end-blocked carbon sample (prepared as described above) was then placed into a standard filtration vessel that allowed radial flow from the outside to the inside of the filter media. The vessel was equipped with an inlet and outlet. The aqueous chloramine test solution was run through the filtration system at a flow rate of 0.13 gallons/minute. In this test, the water flow rate was held constant to give an accelerated test; that is, there was no duty cycle or shutdown period as prescribed in the NSF standard.

The aqueous chloramine test solution described above was flowed through the filtration system for 5 minutes to wet out the carbon block sample. After this, samples of the effluent (outflow from the carbon block sample) were taken periodically and the throughput in gallons was recorded. Effluent samples were analyzed for chloramine using the Chloramine Test described above. The chloramine effluent concentration was then plotted as a function of the aqueous chloramine test solution throughput. The maximum effluent chloramine concentration per NSF 42 is 0.5 mg/L. Capacity of the carbon block sample is reported as the throughput attained before the concentration of chloramines in the effluent rises above 0.5 mg/L.

Carbon Substrate Samples

Carbon Substrate A was an activated carbon powder (nominal −325 mesh, obtained from MeadWestvaco Specialty Chemicals, North Charleston, S.C., under the trade designation "AQUAGUARD POWDER") used as received without further treatment.

Carbon Substrate B (RGC Powder) was an activated carbon powder with an ash content of 2.9 wt % (nominal −325 mesh, obtained from MeadWestvaco Specialty Chemicals, North Charleston, S.C. under the trade designation "RGC POWDER") used as received without further treatment.

Carbon Substrate C was prepared as follows: Carbon Substrate B (500 g) was added to 2 L of 7.5M $HNO_3$ in a 5 L kettle fitted with a reflux condenser and mechanical stirrer. After the evolution of brown $NO_x$ ceased, the mixture was refluxed and stirred overnight. Then the mixture was cooled to room temperature and the solids were collected on a sintered glass filter. The solids were washed with ten 1 L-portions of deionized water then dried for 16 hr in a 130° C. oven. The yield was 532 g.

Carbon Substrate D was prepared as follows: Carbon Substrate B (150 g) was added in portions with mechanical stirring to a solution of 30 g of $(NH_4)_2S_2O_8$ in 1 L of 2N $H_2SO_4$. After 20 hr, the solids were collected on a glass filter. The solids were washed with four 1 L-portions of deionized water then dried for 16 hr at 130° C. The yield was 158 g.

Carbon Substrate E was prepared as follows: Carbon Substrate B (400 g) was divided into three batches. Each batch was loaded into a ceramic boat and heated at 500° C. in air. The three batches were combined and thoroughly mixed. The yield was 368 g.

Carbon Substrate F was a carbon black powder (obtained from Cabot Corporation, Boston, Mass., under trade designation "BLACK PEARL") used as received without further treatment.

Carbon Substrate G was an activated carbon powder (obtained from Kuraray Chemical Company, Woodland Hill, Calif., under trade designation "KURARAY GG") used as received without further treatment.

Carbon Substrate H was prepared as follows: Carbon Substrate G, 498 g, was added to a stirred solution of 110 g $(NH_4)_2S_2O_8$ in 1 L of 2N $H_2SO_4$. After mechanically stirring for 16 hr, the solids were isolated by filtration, washed with three 2 L portions of deionized water then dried in a 130° C. oven. The yield of oxidized granular carbon was 438 g.

Carbon Substrate I was prepared as follows: Carbon Substrate B, 170 g, and 1 L deionized water were placed in a 3 L reaction kettle equipped with a mechanical stirrer. A solution of 17 g bromine in 1.4 L deionized water was added dropwise with stirring over 1 hr. Stirring was continued for 1 hr. Then, the mixture was filtered and the solids washed with three 1 L portions of deionized water. After drying at 130° C. for 2 hrs, the brominated carbon weighed 214 g and was analyzed and found to contain 3.0% Br.

Carbon Substrate K was prepared as follows: A solution of sodium hypobromite, NaOBr, was prepared by dropwise addition of 34 g liquid bromine to an ice-cooled, stirred solution of 16 g sodium hydroxide in 300 mL deionized water.

A mixture of 170 g Carbon Substrate B, 1 L deionized water and 600 g cracked ice was placed in a 3 L reaction kettle surrounded by an ice bath. The above sodium hypobromite solution was added with stirring over 30 min. Stirring was continued for 1 hr. Then, the solid product was isolated by filtration, washed with three 1 L portions of distilled water and dried at 130° C. for 2 hr. The yield was 204 g and was analyzed and found to contain 1.4% Br.

Carbon Substrate L was prepared as follows: Carbon Substrate B (400 g) was loaded into a ceramic boat and heated (i.e. calcined) at 400° C. in flowing nitrogen and then cooled in nitrogen atmosphere.

The carbon, oxygen and ash content of carbons can be determined by thermal programmed oxidation. This is essentially combustion in a TGA instrument. Weight loss is due to loss of carbon as $CO_2$ and so the percent oxygen in the sample follows by difference. It transpires that Carbon Substrate B, C, D, and E contain 0.2, 6.0, 1.9 and 0.4±0.2% oxygen, respectively.

Carbon Substrate M (RGC 325) was a wood-based activated carbon (nominal 80×325 mesh, obtained under the trade designation "RGC 325", from MeadWestvaco Specialty Chemicals, North Charleston, S.C.) used as received without further treatment.

Carbon Substrate N was a wood-based activated carbon (nominal 80×325 mesh) obtained from MeadWestvaco Specialty Chemicals, North Charleston, S.C., under the trade designation "AQUAGUARD 325") used as received without further treatment. Carbon Substrate N is currently commercially marketed for chloramine removal. Carbon Substrate N had a particle size distribution, determined by laser scattering, similar to Carbon Substrate M.

Carbon Substrate O was a coconut shell activated carbon obtained from Kuraray Chemical, Osaka Japan, under the trade designation "PGW100MP". It had a nominal 80×325 mesh particle size.

General Process for Preparing Carbon Oxychalcogenides:

10 g of a carbon substrate was thoroughly mixed with 1 g finely powdered sulfur (nominally 10 wt %) and transferred to a reactor consisting of a 15×1.5 inch (381 mm×38.1 mm) glass tube connected via a 20 mm Solv-Seal joint (Andrews Glass Co., Vineland, N.J.) to a 10 mm greaseless high vacuum stopcock and vacuum line interface. A plug of glass wool was inserted ahead of the stopcock to prevent loss of entrained solids. After outgassing for 30 min, the reactor and contents were heated in a vertical furnace at 400° C. for 1 hr. After cooling to room temperature, the reactor was again evacuated through a liquid nitrogen-cooled trap for 15 min, and then opened to isolate the product.

Materials from Examples 2, 3, 5, 6 and 7 were analyzed by TGA (Thermal Gravimetric Analysis) to ascertain thermal stability. Each exhibited two weight loss events with maximum weight losses in the temperature ranges 211-22° C. 5 and 307-351° C. (Tmax). Maxima were located by plotting the first derivative of weight loss versus temperature.

Tmax for material from Example 5 occurred at 211° C. and 329° C.; and at 221° C. and 351° C. for material from Example 7. Each of these two samples was heated at 170° C. and 315° C. and the volatiles released were examined by mass spectrometry. Only sulfur dioxide was detected.

Examples 1-24 and Comparative Examples A-D

Examples 1-24 were prepared according to the general process for preparing carbon oxychalcogenides described above. Comparative Examples A-D were Carbon Substrates A-D as obtained or prepared as described above. Table 1 below summarizes the materials (such as carbon substrate and chalcogen compound, as well as their relative compositions) and the process conditions used for preparing samples of each of Comparative Examples A-D and Examples 1-24. Departures from the general conditions are noted.

Example 25

Example 25 sample was prepared as follows: Carbon Substrate H, 61 g, and 6.3 g finely powdered sulfur were mixed by tumbling and then transferred to a glass tubular reactor. After evacuation for 20 min, the reactor was placed in a furnace and heated to 400° C. After 1.5 hr, the reactor was cooled to room temperature and volatiles removed under vacuum. The resulting product weighed 62.5 g.

Table 1 below summarizes the materials (such as carbon substrate and chalcogen compound, as well as their relative compositions) and the process conditions used for preparing samples of each of Comparative Examples A-D and Examples 1-25. Departures from the general conditions are noted. Chloramine reduction for the prepared samples for some samples are also included in Table 1. The chloramine reduction reported in Table 1 is determined using the process described above after 150 seconds.

TABLE 1

| Example | Carbon Substrate | Chalcogen Compound used (%, type) | Temperature (° C.) | Chloramine Reduction (%) |
|---|---|---|---|---|
| Comp. A | A | NA | NA | 82 |
| Comp. B | B | NA | NA | 41 |
| Comp. C | C | NA | NA | 18 |
| Comp. D | D | NA | NA | 18 |
| 1 | B | 10%, S | 300 | 39 |
| 2 | B | 1%, S | 300 | 53 |
| 3 | B | 10%, S | 400 | 55 |
| 4 | C | 10%, S | 400 | 50 |
| 5 | D | 10%, S | 400 | 50 |
| 6 | E | 10%, S | 400 | 78 |
| 7 | B | 10%, S | 400* | 63 |
| 8 | B | 8%, $SeO_2$ | 400 | 28 |
| 9 | B | 1.5%, $SeO_2$ | 400 | 33 |
| 10 | B | 10%, Se | 400 | 28 |
| 11 | C | 10%, Se | 400 | 51 |
| 12 | C | 13%, Te # | 400 | 42 |
| 13 | C | 10%, $SeS_2$ | 400 | 28 |
| 14 | B | 26 kPa, $SO_2$ | 400 | 52 |
| 15 | B | 10%, S and 3%, $H_2O$ | 400 | 22 |
| 16 | B | 16%, $SOCl_2$ | 400 | 52 |
| 17 | C | 11%, $(HO)_6Te$ | 400 | 42 |
| 18 | C | 12%, $TeO_2$ | 400 | 29 |
| 19 | B | 15%, $SOCl_2$ | 400 | 43 |
| 20 | C | 20%, S | 400 | 57 |
| 21 | B | 12%, $CS_2$ | 400 | 39 |
| 22 | C | 12%, $CS_2$ | 400 | 63 |
| 23 | F | 10%, S | 400* | 23 |
| 24 | F | 10%, S | 400† | 10 |
| 25 | H | 10%, S | 400 | Not tested |

*performed in air
†performed in vacuum
X-ray powder diffraction analysis of the mostly amorphous product disclosed only weak lines due to Te and $TeO_2$, indicating that most of the Te charged was consumed. Mixing of the Te and C, achieved by tumbling for 1.5 hr., is important in this experiment
NA not applicable Samples of Comparative Example B (Comp. B) and Examples 2-7 above were analyzed by X-ray photoelectron spectroscopy (XPS) and the C(1s), O(1s) and S($2p_{3/2}$) peaks were integrated to determine the surface composition. The Table 2 below summarizes the XPS data for these samples. Note that the values in Table 2 represent the mean of determinations in three separate areas of the samples. While not wishing to be bound by theory, it is believe that these data provide direct experimental evidence for, and quantitation of, oxygen in the resulting materials.

TABLE 2

| Example | Atomic % C | Atomic % O | Atomic % S | Atomic % N |
|---|---|---|---|---|
| Comp. B | 96.8 | 2.9 | 0 | NA |
| 2 | 93.2 | 2.9 | 3.2 | NA |
| 3 | 92.6 | 3.4 | 3.4 | NA |
| 4 | 86.6 | 8.8 | 3.0 | 1.6 |
| 5 | 91.8 | 4.2 | 3.1 | NA |
| 6 | 91.2 | 5.1 | 3.1 | NA |
| 7 | 93.8 | 2.4 | 3.0 | NA |

NA = below the detection limit of >0.1%

Bulk chalcogen content of the samples of some Examples described above was determined by combustion analysis. Because some volatile chalcogen by-products can form and because the carbon oxychalcogenides can adsorb small, but variable amounts of atmospheric moisture, elemental composition cannot be determined by mass balance. Results are shown in Table 3.

TABLE 3

| Example | Type and % Chalcogen Present |
| --- | --- |
| 1 | S, 9.1 |
| 2 | S, 0.9 |
| 3 | S, 8 ± 1 |
| 4 | S, 7.2 |
| 5 | S, 7.4 |
| 6 | S, 9.7 |
| 7 | S, 5.6 |
| 8 | Se, 3.5 |
| 10 | Se, 3.9 |
| 11 | Se, 7.6 |
| 12 | Te, 7.3 |
| 13 | S, 2.8; Se, 5.4 |
| 14 | S, 1.9 |
| 15 | S, 8.9 ± 0.6 |
| 16 | S, 2.5; Cl, 3.5 |
| 17 | Te, 5.8 |
| 19 | S, 1.6; Cl, 4.5 |
| 20 | S, 19.0 |
| 21 | S, 1.3 |
| 22 | S, 5.2 ± 0.9 |
| 25 | S, 5.2 ± 0.9 |

While not wishing to be bound by theory, it is believed that the resulting carbon oxychalcogenides samples do not include non-volatile by-products that remain to clog small pores. For example, as shown in Table 4 below, the as-received Carbon Substrate B has a BET surface area of 1637 $m^2g^{-1}$. When Carbon Substrate B is pre-oxidized using the process described above for preparing Carbon Substrate D, its BET surface area is 1632 $m^2g^{-1}$. When the resulting Carbon Substrate D is heated at 400° C. under vacuum with 10 weight percent powdered sulfur (similar to the process of Example 5) the resulting carbon oxysulfide sample still has a very high BET surface area (1425 $m^2g^{-1}$). Note that the samples were outgassed at 150° C. prior to measuring the BET surface area and $N_2$ was the probe molecule.

TABLE 4

| Sample | BET Surface Area, $m^2g^{-1}$ |
| --- | --- |
| Carbon Substrate B | 1637 |
| Carbon Substrate D | 1632 |
| Example 5 | 1425 |

Example 26

Example 26 sample was prepared as follows: 12 g of Carbon Substrate I was mixed with 1.2 g powdered sulfur. The mixture was outgassed at room temperature for 2 hr, and then heated under vacuum at 400° C. for 1 hr. After cooling to room temperature, volatiles were removed under vacuum. The product weighed 9.2 g and analyzed and found to contain: S, 10.3±0.7%; Br, 1.0±0.09%.

Example 27

Example 27 sample was prepared as follows: 12 g of Carbon Substrate K was mixed with 1.2 g powdered sulfur, outgassed for and heated under vacuum at 400° C. for 1 hr. After cooling, volatiles were removed under vacuum. The product weighed 10.2 g and was analyzed and found to contain S, 9.7±1.0%; Br, 0.7±0.05%.

Figure 2:
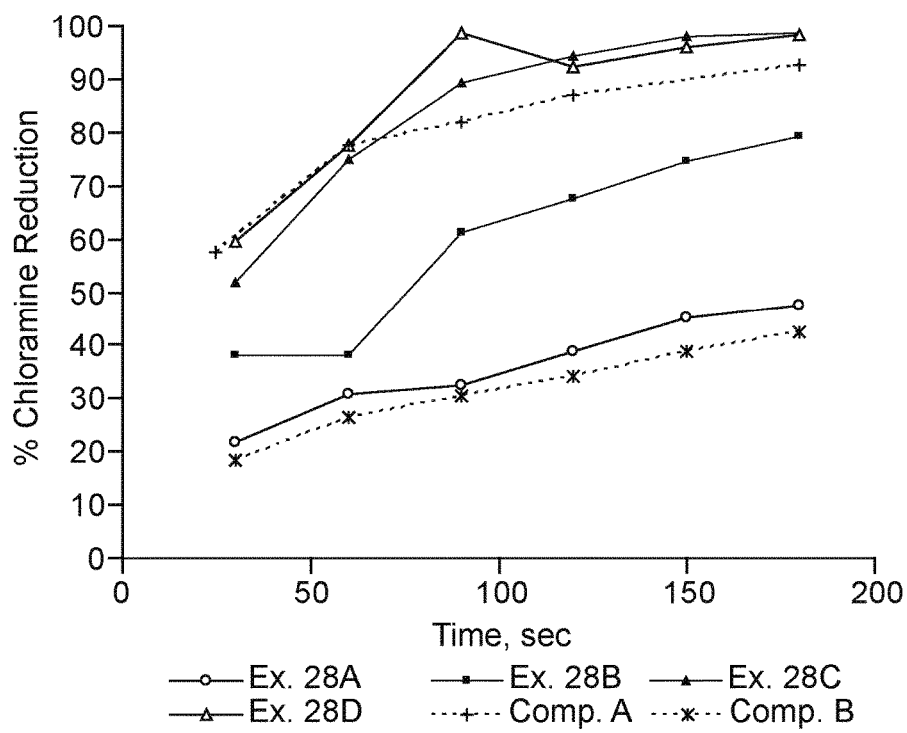
FIG. 2 is a chart of the percent chloramine reduction versus time for Comparative Examples A-B, and Examples 28A-D.

Samples of Examples 6, 7, 26 and 27 and Comparative Example B were tested for their % chloramine reduction as a function of time using the Chloramine Removal Test described above. The results are shown in FIG. 1. Note that the % chloramines reduction of Examples 6 and 7 were higher than that of Comparative Example B. Similarly Examples 26 and 27 prepared by using different oxidizing agents also had higher % chloramine reduction than that of Comparative Example B. Although Examples 6, 7, 26, and 27 all used the same carbon substrate (RGC) as shown in FIG. 2, the different treatments of the carbon substrate yielded materials with different chloramine removal kinetics. While not wishing to be bound by theory, it is believed that this observation can be rationalized retrospectively in terms of the oxygen concentration present during the thermal reaction and the amounts and types of functional groups (e.g. $CO_2H$, C=O or C—OH) produced during the process.

Example 28

Example 28 sample was prepared by first heating Carbon Substrate B (40.0 g) to 180° C. in a crucible, and then adding elemental sulfur (10.0 g, obtained from Alfa Aesar, −325 mesh, 99.5%) with stirring. The sulfur melted and was incorporated into the Carbon Substrate B.

Four small samples (~2 g each) of the Carbon Substrate-sulfur mix from above were transferred to smaller crucibles with loose-fitting lids to make up Examples 28A, 28B, 28C, and 28D. Each of Example 28 A-D crucible was then individually heated in a nitrogen purged muffle furnace at 180, 350, 550 and 750° C., respectively, for 10 minutes. After the heat treatment, each crucible was then transferred to a nitrogen-purged container for cooling to near room temperature.

Example 28 A-D samples prepared above and Comparative Example A and B sample were tested for their % chloramine reduction as a function of time as described above. The results are shown in FIG. 2. The rate of % chloramine reduction of Example 28C, prepared at 550° C., was similar to that of Comparative Example A, which is a specialty carbon marketed as a very high activity media for chloramine reduction. While not wishing to be bound by theory, it is believed that as the temperature is increased during the step of heating the carbon substrate in the presence of sulfur, there is a shift in the distribution of acyclic $S_x$ (x=2-8) species in the sulfur vapor toward smaller, more reactive oligomers.

The Example 28C sample was analyzed by X-ray photoelectron spectroscopy (XPS) and integration of the C(1s), O(1s) and S($2p_{3/2}$) peaks to determine the surface composition. The surface composition of the Example 28C sample was 90.4 atomic (at) % of C, 2.8 at % of 0, and 6.8 at % of S. Note that these values represent the mean of determinations in three separate areas of the sample.

Example 29

Example 29 sample was prepared in the same manner as Example 28C, except that the Carbon Substrate D was used instead of Carbon Substrate B.

Example 30

Example 30 sample was prepared in the same manner as Example 28C, except that the Carbon Substrate E was used instead of Carbon Substrate B.

Figure 3:
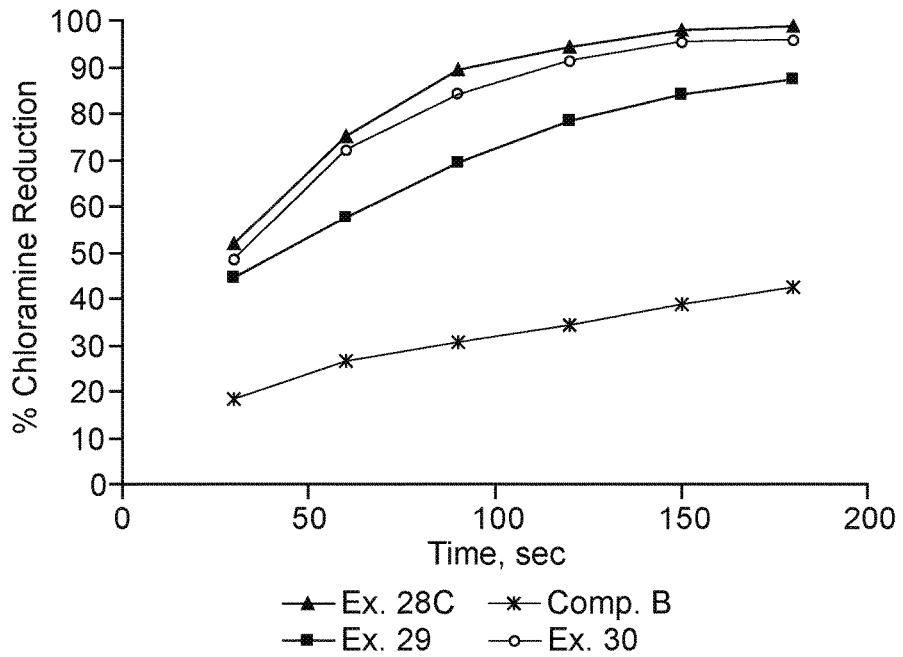
FIG. 3 is a chart of the percent chloramine reduction versus time for Comparative Example B, and Examples 28C, 29, and 30.

Example 28C, 29, 30 samples prepared above and Comparative Example B sample were tested for their % chloramine reduction as a function of time as described above. The results are shown in FIG. 3.

Example 31

Example 31 sample was prepared in the same manner as Example 28C, except that the Carbon Substrate L was used instead of Carbon Substrate B.

Figure 4:
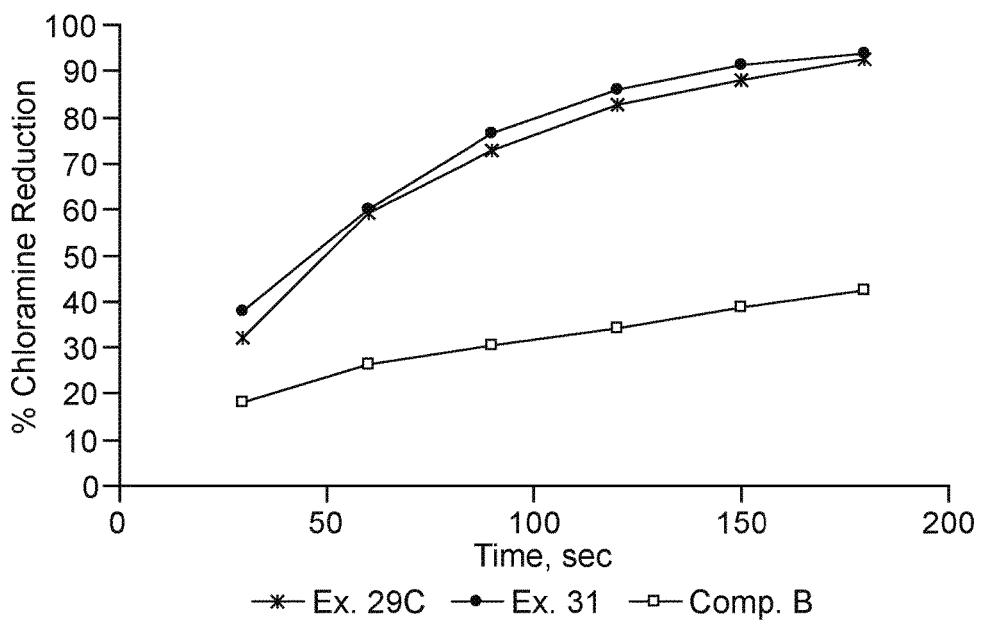
FIG. 4 is a chart of the percent chloramine reduction versus time for Comparative Example B, and Examples 29C and 31.

Example 28C, 31 samples prepared above and Comparative Example B sample were tested for their % chloramine reduction as a function of time as described above. The results are shown in FIG. 4.

Example 32

Examples 32A-32G were prepared using Carbon Substrate B (10.0 g) and grey selenium (1.0 g, obtained from Alfa Aesar, −200 mesh) following the general process for preparing carbon oxychalcogenides described above except that the samples were heated to 400° C. for Example 32A, 500° C. for Example 32B, 600° C. for Example 32C, 700° C. for Example 32D, 800° C. for Example 32E, 900° C. for Example 32F and 1000° C. for Example 32G. XRD patterns for Examples 32A-32G samples did not include peaks for Se or $SeO_2$, indicating that all of Se was consumed in the reaction. Bulk chalcogen content of the samples of Examples 32A-32G were determined by using an ICP optical emission spectrophotometer (Model Perkin Elmer Optima 3300VP obtained from Perkin Elmer, Inc. Waltham, Mass.). Examples 32A-32G samples contained 4.2, 5.8, 5.5, 7.1, 7.3, 6.0, 3.6 wt % Se, respectively. Examples 32A-32G samples prepared above and Comparative Example B sample were tested for their % chloramine reduction as a function of time as described above. After 300 seconds of testing Comparative Example B sample removed 51.5% of chloramine. After 300 seconds of testing Examples 32A-32G samples removed 62.5, 59.4, 54.5, 53.1, 53, 40.6, and 25% of chloramine, respectively.

Example 33

Examples 33A-33E were prepared using Carbon Substrate B (10.0 g) and $CS_2$ (1.2 g) following the general process for preparing carbon oxychalcogenides described above except that the air was not removed from the reactor prior to heating. The samples were heated to 400° C. for Example 33A, 500° C. for Example 33B, 600° C. for Example 33C, 700° C. for Example 33D, 800° C. for Example 33E, 900° C. Bulk chalcogen content of the samples of Examples 33A-33E were determined by using by combustion analysis. Examples 33A-33E samples contained 2.4, 3.0, 3.5, 3.9, 4.0 wt % S, respectively. Examples 33A-33E samples prepared above and Comparative Example B sample were tested for their % chloramine reduction as a function of time as described above. After 300 seconds of testing Comparative Example B sample removed 53.3% of chloramine. After 300 seconds of testing Examples 33A-33E samples removed 63.3, 66.7, 63.3, 63.3, and 60% of chloramine, respectively.

Example 34

Examples 34A-34E were prepared using Carbon Substrate B (8.0 g) and powdered $SeO_2$ (1.0 g) following the general process for preparing carbon oxychalcogenides described above except that the reactor was back filled with 1 atmosphere of nitrogen after outgassing and the samples were heated to 500° C. for Example 34A, 600° C. for Example 34B, 700° C. for Example 34C, 800° C. for Example 34D, 900° C. for Example 34E, 900° C. XRD patterns for Examples 34A-34E samples did not include peaks for Se or $SeO_2$, indicating that all of $SeO_2$ was consumed in the reaction. Bulk chalcogen content of the samples of Examples 34A-34E were determined by using an ICP optical emission spectrophotometer (Model Perkin Elmer Optima 3300VP obtained from Perkin Elmer, Inc. Waltham, Mass.). Examples 34A-34E samples contained 8.0, 5.1, 5.6, 5.8, 5.3 wt % Se, respectively. Examples 34A-34E samples prepared above and Comparative Example B sample were tested for their % chloramine reduction as a function of time as described above.

Example 35

Example 35 sample was prepared by first heating Carbon Substrate M (>40 cc) to 180° C. in a crucible, and then adding elemental sulfur (0.2 g sulfur per gram carbon, obtained from Alfa Aesar, −325 mesh, 99.5%) with stirring. The sulfur melted and was incorporated into the Carbon Substrate M.

A sample (~40 to 100 cc) of the Carbon Substrate-sulfur mix from above was transferred to a crucible with a loose-fitting lid. The crucible was then placed in a nitrogen purged muffle furnace, equilibrated to 550° C. and held at that temperature for 10 minutes. The crucible was removed from the furnace and transferred to a nitrogen-purged container for cooling to near room temperature.

Example 36

Example 36 was prepared and tested in the same manner as Example 35, except that the Carbon Substrate O was used instead of Carbon Substrate M.

Figure 5:
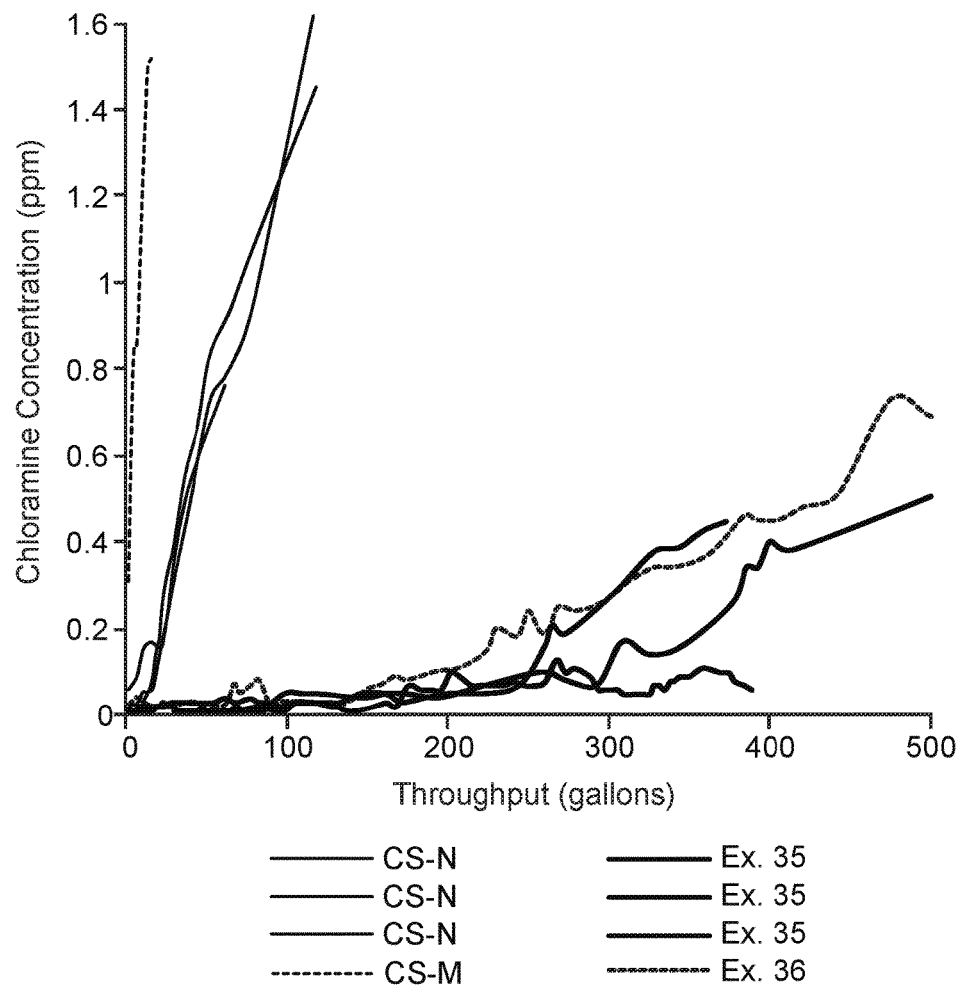
FIG. 5 is a chart of the concentration of chloramines in the effluent versus the throughput for Examples 35 and 36 and Carbon Substrates M and N.

The carbon-oxychalcogenide sample from Examples 35 and 36, as well as Carbon Substrate M and N, were individually made into a carbon block following the Preparing Carbon Blocks method described above. Each of the carbon blocks was tested for chloramine removal following the Chloramine Removal Test 2 (Flow-system Method) as described above. Three carbon blocks comprising the Carbon Substrate N were prepared and analyzed for Chloramine Removal and 3 carbon blocks comprising the Example 35 carbon oxychalcogen were prepared and analyzed for Chloramine Removal. The results are shown in FIG. 5, where the carbon block made with Carbon Substrate M is CS-M, Carbon Substrate N is CS—N, Example 35 is Ex 35, and Example 36 is Ex 36. FIG. 5 shows the amount of chloramine present in the effluent (in ppm) versus throughput (i.e., how many gallons of the chloramine-containing water were run through the carbon block).

Shown in Table 5 below is the approximate average chloramine capacities for the carbon blocks tested based on a 0.5 mg/L maximum effluent concentration.

TABLE 5

| Carbon material used to make carbon block | Chloramine Capacity |
| --- | --- |
| CS-M | <1 gallon |
| CS-N | 30-40 gallons |
| Ex. 35 | >400 gallons |
| Ex. 36 | >400 gallons |

Analysis of Hydrogen, Nitrogen and Sulfur

Examples 35 and 36 were analyzed for weight percent Carbon, Hydrogen, Nitrogen and Sulfur by combustion using a LECO TruSpec Micro CHNS elemental analyzer, Laboratory Equipment Co. St. Joseph, Mich. Briefly, the sample is placed in the instrument and purged of atmospheric gases. The sample is then heated to over 1000° C. in the presence of oxygen to combust the sample. The sample is then passed through a second furnace for further oxidation, reduction, and particulate removal. The combustion gases are then passed through various detectors to determine the content of the carbon, hydrogen, nitrogen, and sulfur.

A sulfamethazine standard (>99%, from LECO) was diluted to make a calibration curve ranging from 1 mg to 2.6 mg sulfamethazine. The instrument is baselined with ambient air until the CHNS detectors stabilized. Then, 3-4 empty crucibles were measured and set as instrument blanks. Next, the sulfamethazine standards were analyzed to form a calibration curve. The absolute standard deviation of the sulfamethazine standard (acceptable precision for a pure homogeneous material) for the elements were: <+/−0.3 wt. % for Hydrogen, <+/−0.3 wt. % for Nitrogen and <+/−0.3 wt. % for Sulfur with a limit of detection of 0.10 wt % for each of the elements. Examples 35 and 36 were then analyzed for their carbon, hydrogen, nitrogen, and sulfur content. Example 35 had 14.42 wt % sulfur and the hydrogen and nitrogen were below the limit of detection. Example 36 had 8.44 wt % sulfur, 0.12 wt % nitrogen and the hydrogen was below the limit of detection.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. A filtration device comprising a carbon block, the carbon block comprising
   (i) a plurality of first activated carbon particles, wherein the first activated carbon particles have a surface of $CO_xS_y$; and wherein x is no more than 0.1, and y is 0.005 to 0.3; and
   (ii) a binder comprising polyethylene.
2. The filtration device of claim 1, wherein the carbon block further comprises an adsorbent.
3. The filtration device of claim 1, wherein the polyethylene is an ultra high molecular weight polyetheylene.
4. The filtration device of claim 1, wherein the first activated carbon particles have an average diameter of at least 5 micrometers and at most 500 micrometers.
5. The filtration device of claim 1, wherein the activated carbon particle of the first activated carbon particles is derived from coconut shells.
6. The filtration device of claim 1, wherein the plurality of first activated carbon particles comprises greater than 6.0 mass % sulfur based on the total mass of the first activated carbon particles.
7. The filtration device of claim 1, wherein the carbon block further comprising a plurality of second activated carbon particles.
8. The filtration device of claim 7, wherein the plurality of second activated carbon particles comprises less than 1 mass % sulfur based on the total mass of the second activated carbon particles.
9. The filtration device of claim 1, wherein the carbon block is disposed in a housing.

* * * * *